Sept. 22, 1936.  F. SEBURGER  2,055,314
EYEGLASS CLEANER
Filed Aug. 8, 1935
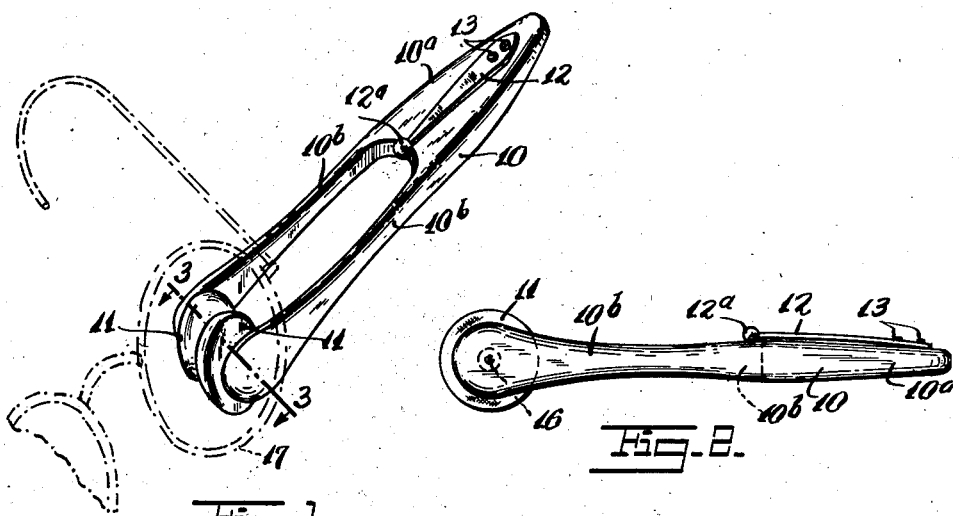
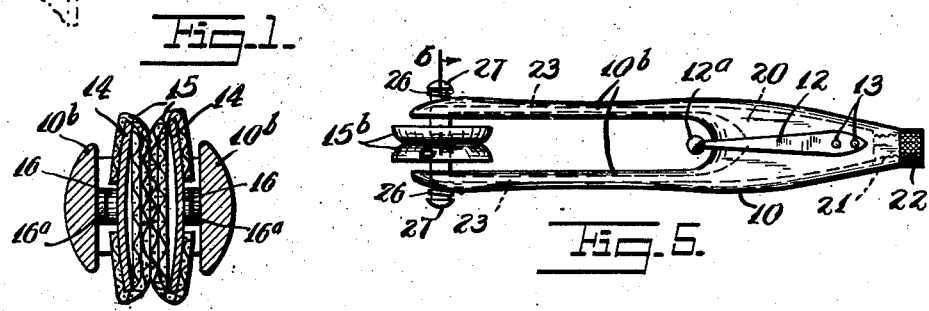
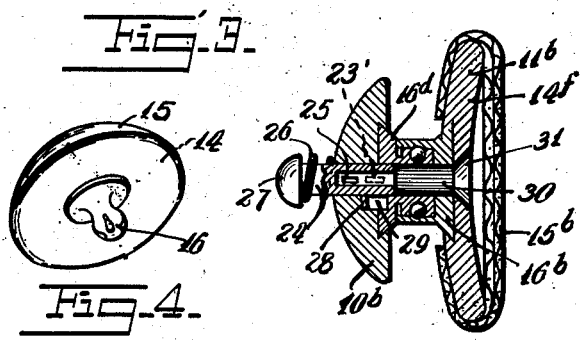
INVENTOR
FREDERICK SEBURGER
BY
ATTORNEY Patented Sept. 22, 1936

2,055,314

UNITED STATES PATENT OFFICE 2,055,314

EYEGLASS CLEANER

Frederick Seburger, Maplewood, N. J.

Application August 8, 1935, Serial No. 35,280

3 Claims. (Cl. 15—214)

This invention relates to new and useful improvements in an eyeglass cleaner.

The invention has for an object the construction of a cleaner as mentioned which is characterized by a flat body holding cleaning pads, the body to have a flat pointed rear portion from which a pair of spaced flexible arms project, and the cleaning pads to be supported on said arms.

Still further the invention contemplates an efficient and simple manner for detachably mounting the cleaning pads on the arms so that they may be removed and replaced when necessary.

A further object of the invention is the provision of a clip on the body portion arranged in a manner so that the eyeglass cleaner may be conveniently carried in one's outer pocket in a manner similar to the carrying of a fountain pen.

A further object of the invention is to provide a compartment in the body for a cleaning fluid, liquid wax or other liquid or semi-liquid, which may be advantageously used in the cleaning of the glasses.

It is further proposed to provide an arrangement whereby this cleaning fluid, liquid wax or the like, may be easily supplied to the cleaning pads.

Another object of the invention is the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of an eyeglass cleaner constructed according to this invention.

Fig. 2 is a side elevational view of Fig. 1.

Fig. 3 is a sectional view taken on the line 3—3 of Fig. 1.

Fig. 4 is a perspective view of one of the removable pads.

Fig. 5 is a plan view of an eyeglass cleaner constructed according to a modification of the invention.

Fig. 6 is a fragmentary enlarged sectional view taken on the line 6—6 of Fig. 5.

The eyeglass cleaner, according to this invention, comprises a body 10 with a flat pointed rear portion 10ᵃ from which a pair of spaced flexible arms 10ᵇ project. A pair of cleaning pads 11 are mounted upon the opposed sides of the arms 10ᵇ and are adapted to engage the sides of the lenses of an eyeglass, for cleaning purposes. A clip 12 is mounted upon the body portion by which the cleaner may be readily supported upon an edge of cloth, such as one's outer coat pocket, etc.

The clip 12 is secured by several rivets 13 at its rear end upon the body portion 10ᵃ and extends towards the arms 10ᵇ and terminates in a head 12ᵃ located at the junction between the arms 10ᵇ. Thus, normally a portion of the head 12ᵃ is disposed within the spaces between the junction of the arms. When the article is engaged in position on a coat pocket or the like, the cloth material will be forced in between the spaces of the arms 10ᵇ and so the cleaner be held conveniently in position.

The pads 11 comprise rigid cores 14 upon which cloth 15 is attached. This core is preferably curved as illustrated in Fig. 3. Snap fastener elements 16 are mounted upon the cores 14 and are coactable with complementary snap fastener elements 16ᵃ mounted upon the inner faces of the arms 10ᵇ. The construction is such that either one of the pads or both of the pads may be detached from the arms when desired by merely forcing them laterally to disconnect the snap fasteners.

In Fig. 1 the dot and dash lines 17 indicate a pair of spectacles and show the manner in which the cleaner is intended to be used. The lenses are forced in between the pads and the cleaner moved so that the pads engage over the surface of the lenses. Additional pressure may be applied to the pads by manually pressing the flange arms 10ᵇ together.

In Figs. 5 and 6 another embodiment of the invention has been disclosed which is very similar to the preferred form, distinguishing merely in the provision of a liquid cleaner. More particularly, the body 10 has an internal hollow or compartment 20 which may be filled with liquid through an opening 21. This opening 21 is normally closed by a removable plug screw 22. Passages 23 extend from the compartment 20 through the arms 10ᵇ to valve seats 23′. These valve seats are engaged by cylindrical shaped plunger valves 24.

Each plunger valve 24 comprises a hollow tubular member having an opening 25 adapted in one position of the valve to align with the seat 23′ so that the liquid may pass. The valves 24 are slidably mounted through the arms 10ᵇ. Springs 26 act between heads 27 on the valve and the arms so as to normally urge the valves into closed positions. Pins 28 from the valve work in longitudinal slots 29 in the fingers so as to limit the travel of the valves and to prevent the valves from turning.

The pads 11$^b$ have central cores 14$^f$ and outer cloth covering material 15$^b$. The cores 14$^b$ support snap fastener elements 16$^b$ engageable with complementary snap fastener elements 16$^d$ upon the arms. These snap fastener elements have central passages 30 which connect with passages 31 in the cores 14$^b$. The construction allows the liquid from the valve seats 23' to reach the cloth coverings 15$^b$.

The operation of this device is similar to the prior form except for the fact that the pads may be moistened or may be supplied with liquid wax by merely depressing the heads 27 of the valves. This moves the valves inward to open positions and allows a supply of the liquid to reach the coverings of the pads. The liquid should be applied to the pads as needed.

It is to be understood that the holder of this device may be made of metal, composition or of any other suitable material.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An eyeglass cleaner comprising a body with a rear portion from the forward end of which a pair of spaced flexible arms project, cleaning pads on the opposed sides of said arms for engaging the sides of the lenses of eyeglasses, and a clip mounted on the body by which the cleaner may be detachably mounted on edges of cloth, such as the mouth of a pocket and having a head portion disposed in the space between said flexible arms.

2. An eyeglass cleaner, comprising a body with a rear portion from the forward end of which a pair of spaced flexible arms project, cleaning pads on the opposed sides of said arms for engaging the sides of the lenses of eyeglasses, and a clip mounted on the flat body by which the cleaner may be detachably mounted on edges of cloth, such as the mouth of a pocket, said clip having a shank portion attached upon the body and a head portion disposed near the junction of and between said flexible arms.

3. In an eyeglass cleaner, a body with a rear portion from the forward end of which a pair of spaced flexible arms project, cleaning pads with coverings on the opposed sides of said arms for engaging the sides of the lenses of eyeglasses, and said body being formed with a liquid compartment, including passages through the flexible arms to the vicinity of the pads, valves mounted in the flexible arms at their extremities and having operating parts projecting from the outer side of each arm to control the supply of liquid, and passages from the valves to the coverings of said pads.

FREDERICK SEBURGER.